US008819400B2

(12) United States Patent  (10) Patent No.: US 8,819,400 B2
Fang et al.  (45) Date of Patent: Aug. 26, 2014

(54) COMPUTER APPARATUS WITH SWITCHABLE INPUT OUTPUT SYSTEM

(75) Inventors: Lan-Lan Fang, Shanghai (CN); Shih-Hao Liu, Taipei (TW)

(73) Assignee: Inventec Corporation, Taipei (TW)

( * ) Notice: Subject to any disclaimer, the term of this patent is extended or adjusted under 35 U.S.C. 154(b) by 514 days.

(21) Appl. No.: 12/419,475

(22) Filed: Apr. 7, 2009

(65) Prior Publication Data

US 2010/0211764 A1    Aug. 19, 2010

(30) Foreign Application Priority Data

Feb. 19, 2009 (TW) ............................... 98105257 A

(51) Int. Cl.
*G06F 15/177* (2006.01)
*G06F 13/38* (2006.01)

(52) U.S. Cl.
CPC ............ *G06F 13/385* (2013.01); *G06F 15/177* (2013.01)
USPC .................................................. 713/1; 713/2

(58) Field of Classification Search
USPC .......................................................... 713/1, 2
See application file for complete search history.

(56) References Cited

U.S. PATENT DOCUMENTS

| 6,704,808 | B2* | 3/2004 | Kasamatsu et al. | 710/2 |
| 7,818,554 | B2* | 10/2010 | Wang et al. | 713/1 |
| 7,996,667 | B2* | 8/2011 | Hwang | 713/2 |
| 2001/0016905 | A1* | 8/2001 | Kasamatsu et al. | 713/100 |
| 2007/0033390 | A1* | 2/2007 | Chang et al. | 713/2 |
| 2007/0097048 | A1* | 5/2007 | Watanabe | 345/87 |
| 2007/0120752 | A1* | 5/2007 | Takasu | 343/702 |
| 2008/0148038 | A1* | 6/2008 | Abe et al. | 713/2 |
| 2009/0158024 | A1* | 6/2009 | Hung et al. | 713/2 |
| 2009/0240934 | A1* | 9/2009 | Chou | 713/2 |

FOREIGN PATENT DOCUMENTS

CN        200990079        12/2007

OTHER PUBLICATIONS

"Office Action of Taiwan Counterpart Application", issued on Jul. 16, 2012, p. 1-p. 5.

* cited by examiner

*Primary Examiner* — Chun Cao
(74) *Attorney, Agent, or Firm* — CKC & Partners Co., Ltd.

(57) ABSTRACT

A computer apparatus is disclosed. The computer apparatus mentioned above includes a main board and an external sub-board. The main board includes a connector, a management chip, a first basic input output system and a selector. The external sub-board includes an external input output system. The management chip detects a coupling state of the main board and the external sub-board, and generates a detecting signal. The selector enables one of the first basic input output system and the external input output system and disables the other one.

8 Claims, 3 Drawing Sheets

COMPUTER APPARATUS WITH SWITCHABLE INPUT OUTPUT SYSTEM

CROSS-REFERENCE TO RELATED APPLICATION

This application claims the priority benefit of Taiwan application serial no. 98105257, filed on Feb. 19, 2009. The entirety of the above-mentioned patent application is hereby incorporated by reference herein and made a part of specification.

BACKGROUND OF THE INVENTION

1. Field of the Invention

The present invention related to a computer apparatus. More particularly, the present invention related to a computer apparatus coupling to an external sub-board of an intelligent platform management interface (IPMI).

2. Description of Related Art

With advent of the digital age, computer apparatus have become indispensable tools in people's daily life. To meet daily utilization demands of the computer apparatus, peripherals capable of coupling to the computer apparatus are developed. Correspondingly, the computer apparatus must provide a plurality of different connection interfaces (for example, a universal serial bus (USB) interface, a network interface card (NI) and a keyboard/mouse switch, etc.) for connecting to the peripherals.

However, since not all of the peripherals used by the users are the same. Therefore, it is quite difficult to provide a basic input output system (BIOS) to support all of the peripherals. If the provided BIOS which supports fixed peripherals, utilization of the computer apparatus is lack of flexibility and limit a performance of the computer apparatus.

SUMMARY OF THE INVENTION

The present invention is directed to a computer apparatus, in which an inbuilt BIOS or an external input output system of an external sub-board can be switched for utilization, so as to improve a utilization flexibility of the computer apparatus.

The present invention provides a computer apparatus including a main board and an external sub-board. The main board includes a connector, a management chip, a first BIOS and a selector. The management chip is coupled to the connector, and generates a detecting signal. The first BIOS is coupled to the management chip, and the selector is coupled to the first BIOS and the management chip, and receives the detecting signal. The external sub-board is coupled to the main board through the connector, and the external sub-board includes an external input output system. The management chip detects a coupling state of the main board and the external sub-board to generate the detecting signal. The selector enables one of the first BIOS and the external input output system, and disables another one of the first BIOS and the external input output system according to the detecting signal.

In an embodiment of the present invention, when the management chip detects that the external sub-board is coupled to the main board, the management chip enables the external input output system, and disables the first BIOS.

In an embodiment of the present invention, when the management chip detects that the external sub-board is not coupled to the main board, the management chip enables the first BIOS.

In an embodiment of the present invention, the management chip is a chip set including a north bridge chip and a south bridge chip, wherein the south bridge chip is coupled to the north bridge chip and the first BIOS.

In an embodiment of the present invention, the main board of the computer apparatus further includes a central processor unit coupled to the north bridge chip.

In an embodiment of the present invention, the management chip is a baseboard management controller.

In an embodiment of the present invention, the main board of the computer apparatus further includes a central processor unit, a chip set and a second BIOS. The chip set is coupled to the central processor unit and the baseboard management controller, and the second BIOS is coupled to the chip set.

In an embodiment of the present invention, the second BIOS is a flash memory with a serial peripheral interface.

In an embodiment of the present invention, the first BIOS and the external input output system are respectively a flash memory of a serial peripheral interface.

In an embodiment of the present invention, the external sub-board is an intelligent platform management interface (IPMI) card.

In an embodiment of the present invention, the selector includes a switch and a pull-up circuit, wherein the switch is controlled by the detecting signal, and one end of the switch is coupled to the first BIOS, and another end of the switch is coupled to the connector. The pull-up circuit is coupled to the switch and the first BIOS.

In an embodiment of the present invention, the switch is a transistor, wherein a gate of the transistor receives the detecting signal, a first source/drain of the transistor is coupled to first BIOS, and a second source/drain of the transistor is coupled to the connector.

In an embodiment of the present invention, the switch further include a diode, wherein a cathode of the diode is coupled to the second source/drain of the transistor, and an anode of the diode is coupled to the first source/drain of the transistor.

In an embodiment of the present invention, the pull-up circuit includes a pull-up resistor serially connected between a first reference voltage and the switch.

In the present invention, by detecting the coupling state of the external sub-board and the main board of the computer apparatus, the BIOS originally set on the main board or the external input output system of the external sub-board is switched. Therefore, the computer apparatus can add or remove peripherals thereof according to different demands of the user, so as to improve the utilization flexibility of the computer apparatus.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
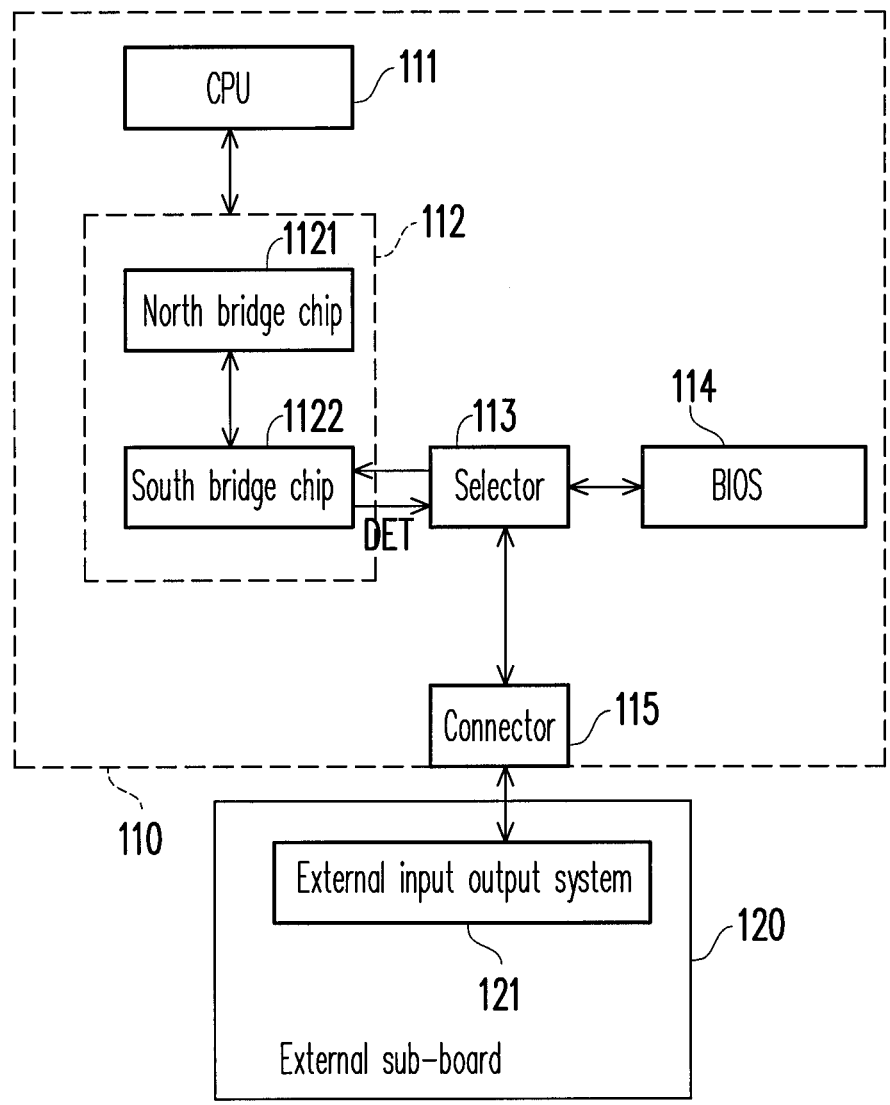
FIG. 1 is a schematic diagram illustrating a computer apparatus 100 according to an embodiment of the present invention.

Referring to FIG. 1, FIG. 1 is a schematic diagram illustrating a computer apparatus 100 according to an embodiment of the present invention. The computer apparatus 100 of the present embodiment is used for personal utilizations. The computer apparatus 100 includes a main board 110 and an external sub-board 120. The main board 110 includes a central processor unit (CPU) 111, a management chip 112, a selector 113, a BIOS 114 and a connector 115. The CPU 111 is coupled to the management chip 112, and the management chip 112 is coupled to the selector 113. Moreover, the selector 113 is coupled to the connector 115 and the BIOS 114. Here, the management chip 112 is a chip set well known by those skilled in the art, and the chip set includes mutually coupled a north bridge chip 1121 and a south bridge chip 1122.

On the other hand, the external sub-board 120 includes an external input output system 121. When the external sub-board 120 is about to be coupled to the main board 110, it is coupled to the main board 110 through the connector 115. The connector 115 can be disposed on an expansion slot of the main board 110 for coupling the external sub-board 120.

Regarding detailed operations of the computer apparatus 100, the management chip 112 detects a coupling state of the external sub-board 120 and the main board 110 in real-time. When the management chip 112 detects that the external sub-board 120 is coupled to the main board 110 through the connector 115, the management chip 112 generates a detecting signal DET, and the management chip 112 transmits the detecting signal DET to the selector 113. The selector 113 disables or enables the coupled BIOS 114 or the external input output system 121 according to the detecting signal DET. Further, when the detecting signal DET received by the selector 113 represents that the external sub-board 120 is coupled to the main board 110, the selector 113 disables the BIOS 114, and enables the external input output system 121 on the external sub-board 120. Conversely, when the detecting signal DET received by the selector 113 represents that the external sub-board 120 is not coupled to the main board 110, the selector 113 enables the BIOS 114 originally set on the main board 110.

According to the above description, once the external sub-board 120 is connected to the main board 110, the computer apparatus 100 selects the external input output system 121 on the external sub-board 120 through the selector 113 for substituting the original BIOS 114. In other words, the computer apparatus 100 uses the external input output system 121 to serve as a basis for setting a peripheral interface when the external sub-board 120 is coupled to the main board 110. By such means, the user can set a content of the external input output system 121 according to personal demands, so that the computer apparatus 100 can work in response to different utilization demands.

It should be noticed that the external input output system 121 on the external sub-board 120 and the BIOS 114 on the main board 110 can be flash memories with so-called serial peripheral interface (SPI), and the external sub-board 120 is an intelligent platform management interface (IPMI) card.

Figure 2:
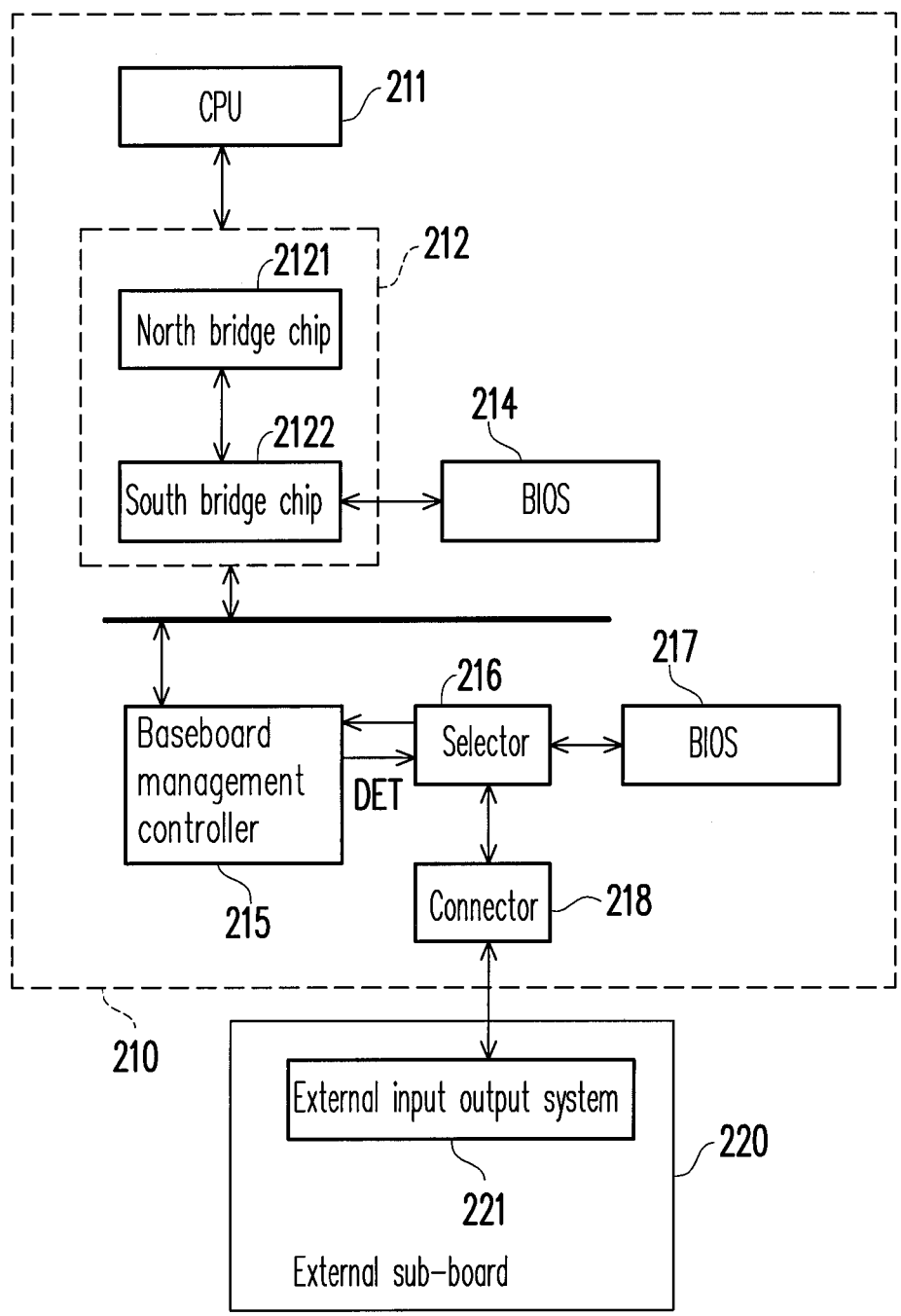
FIG. 2 is a schematic diagram illustrating a computer apparatus 200 according to another embodiment of the present invention.

Referring to FIG. 2, FIG. 2 is a schematic diagram illustrating a computer apparatus 200 according to another embodiment of the present invention. Here, the computer apparatus 200 is used as a computer apparatus of a server. The computer apparatus 200 includes a main board 210 and an external sub-board 220. The main board 210 includes a CPU 211, a chip set 212, a BIOS 214, a baseboard management controller 215 serving as a management chip, a selector 216, a BIOS 217 and a connector 218.

The CPU 211 is coupled to the chip set 212, the chip set 212 is coupled to the BIOS 214 and the baseboard management controller 215. The baseboard management controller 215 is coupled to the selector 216, and the selector 216 is coupled to the BIOS 217 and the connector 218. The chip set 212 includes a north bridge chip 2121 and a south bridge chip 2122, and the north bridge chip 2121 and the south bridge chip 2122 are coupled to each other.

The external sub-board 220 includes an external input output system 221. When the external sub-board 220 is about to be coupled to the main board 210, the external sub-board 220 is coupled to the main board 210 through the connector 218.

In the computer apparatus 200, the baseboard management controller 215 detects a coupling state of the external sub-board 220 and the main board 210 to generate the detecting signal DET. The baseboard management controller 215 transmits the detecting signal DET to the selector 216. Similar to the computer apparatus 100 of the aforementioned embodiment, the selector 216 disables or enables the BIOS 217 and the external input output system 221 according to the detecting signal DET. Moreover, the operation that the selector 216 disables or enables the BIOS 217 and the external input output system 221 according to the detecting signal DET is the same to the embodiment of the computer apparatus 100, and therefore detailed description thereof is not repeated.

To fully convey the spirit of the present invention to those skilled in the art, another embodiment is provided below for further description.

Figure 3:
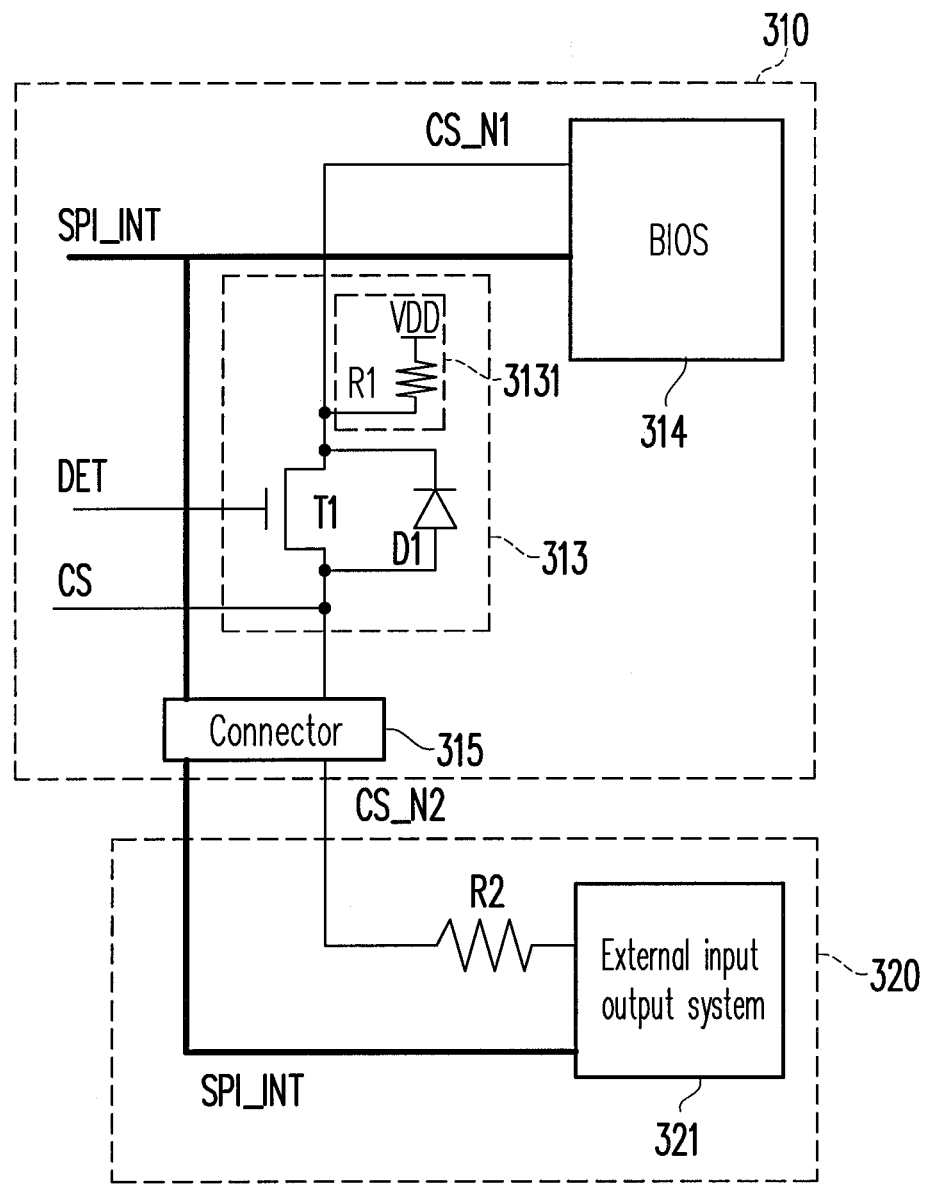
FIG. 3 is a schematic diagram illustrating a computer apparatus 300 according to still another embodiment of the present invention.

Referring to FIG. 3, FIG. 3 is a schematic diagram illustrating a computer apparatus 300 according to still another embodiment of the present invention. The computer apparatus 300 includes a main board 310 and an external sub-board 320. The main board 310 includes a selector 313, a BIOS 314, and a connector 315. In the present embodiment, the BIOS 314 is formed by a flash memory with a serial peripheral interface. Namely, reading and writing the BIOS 314 is performed in response to a serial peripheral interface signal SPI_INT. Moreover, the BIOS 314 is coupled to an enable signal CS_N1. In the present embodiment, when the enable signal CS_N1 received by the BIOS 314 is logic low, the BIOS 314 is enabled. Conversely, when the enable signal CS_N1 received by the BIOS 314 is logic high, the BIOS 314 is disabled.

Moreover, the selector 313 includes a pull-up circuit 3131, a transistor T1, and a diode D1. Here, the transistor T1 and the diode D1 form a switch, wherein a gate of the transistor T1 is coupled to the detecting signal DET (i.e. the switch formed by the transistor T1 is controlled by the detecting signal DET), and two ends (a first source/drain and a second source/drain of the transistor T1) of the switch respectively receive an enable signal CS and transmit the enable signal CS_N1, wherein the enable signal CS is transmitted by a management chip (not shown) of the computer apparatus 300. In the present embodiment, the enable signal CS is logic low. An anode of the diode D1 is coupled to the second source/drain of the transistor T1, and a cathode of the diode D1 is coupled to the first source/drain of the transistor T1.

The external sub-board 320 includes an external input output system 321, and the external input output system 321 is also formed by a flash memory with a serial peripheral interface. Therefore, reading and writing the external input output system 321 is also performed in response to the serial peripheral interface signal SPI_INT coupled through the connector 315. In addition, the external input output system 321 is disabled or enabled in response to an enable signal CS_N2.

Regarding detailed operations of the computer apparatus 300, when the external sub-board 320 is coupled to the main board 310 through the connector 315, the management chip of the computer apparatus 300 detects such coupling state and generates the detecting signal DET. The transistor T1 is turned off in response to the detecting signal DET. At this time, a connecting path between the enable signal CS_N1 and the enable signal CS is cut off, and a voltage level of the enable signal CS_N1 is pulled up by a pull-up resistor R1 of the pull-up circuit 3131, and equals to a voltage level (for example, the logic high level) of a reference voltage VDD. Therefore, the BIOS 314 is disabled.

Moreover, by coupling the external sub-board 320 to the main board 310 through the connector 315, the enable signal CS_N2 is coupled to the enable signal CS. At this time, the enable signal CS_N2 is equivalent to the enable signals CS, and has the logic low level. Accordingly, the external input output system 321 receives the enable signal CS_N2 through a resistor R2, and is enabled.

In addition, when the external sub-board 320 is separated from the main board 310, the management chip of the computer apparatus 300 transmits the detecting signal DET, and turns on the transistor T1. Now, the connecting path between the enable signal CS and the enable signal CS_N1 is turned on, so that the voltage level of the enable signal CS_N1 is equivalent to the voltage level of the enable signal CS, and has the logic low level, and therefore the BIOS 314 is enabled.

It should be noticed that implementing of the switch in the computer apparatus 300 is only an example, which means the embodiment of the present invention do not have to use the transistor T1 to implement the switch, and those skilled in the art can use other switches in the embodiment of the present invention. Similarly, the pull-up circuit implemented by the pull-up resistor R1 in the embodiment of the computer apparatus 300 is also an example, which is not used for limiting the present invention.

In summary, by detecting the coupling state of the external sub-board and the main board, the BIOS originally set on the main board or the external input output system on the external sub-board is selected by the computer apparatus, by which a content of the external input output system on the external sub-board can be set according to different demands of the user. Therefore, the utilization flexibility of the computer apparatus can be effectively improved, so as to improve a performance of the computer apparatus.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer apparatus, comprising:
a main board, comprising:
    a connector;
    a management chip, coupled to the connector, and generating a first detecting signal and a second detecting signal;
    a switch, coupled to the management chip; and
    a first basic input output memory comprising a first basic input output system, wherein the first basic input output memory is coupled to the switch; and an external sub-board, coupled to the main board through the connector, wherein the external sub-board comprises an external input output memory and the external input output memory comprises an external input output system, wherein the first basic input output memory and the external input output memory provide different connection interfaces for different peripherals;

wherein when the management chip detects that the external sub-board is coupled to the main board, the management chip generates the first detecting signal to cut off the switch, an enable signal enables the external input output system through the connector, and a disable signal disables the first basic input output system, and when the management chip detects that the external sub-board is not coupled to the main board, the management chip generates the second detecting signal to turn on the switch, the enable signal enables the first basic input output system through the switch;

wherein detection that the external sub-board is coupled to the main board and generation of the first detecting signal to cut off the switch in response are performed automatically by the management chip, and detection that the external sub-board is not coupled to the main board and generation of the second detection signal to turn on the switch in response are performed automatically by the management chip.

2. The computer apparatus as claimed in claim 1, wherein the management chip is a chip set, and the chip set comprises:
a north bridge chip; and
a south bridge chip, coupled to the north bridge chip and the first basic input output memory.

3. The computer apparatus as claimed in claim 2, wherein the main board further comprises:
a central processor unit, coupled to the north bridge chip.

4. The computer apparatus as claimed in claim 1, wherein the management chip is a baseboard management controller.

5. The computer apparatus as claimed in claim 4, wherein the main board further comprises:
a central processor unit;
a chip set, coupled to the central processor unit and the baseboard management controller; and
a second basic input output memory, coupled to the chip set.

6. The computer apparatus as claimed in claim 5, wherein the chip set comprises:
a south bridge chip, coupled to the second basic input output memory and the baseboard management controller; and
a north bridge chip, coupled to the south bridge chip and the central processor unit.

7. The computer apparatus as claimed in claim 1, wherein the switch comprises:
a transistor, one end of the transistor being coupled to the first basic input output memory, and another end of the transistor being coupled to the connector; and
a pull-up circuit, coupled to the transistor and the first basic input output memory.

8. The computer apparatus as claimed in claim 7, wherein a gate of the transistor receives the first detecting signal or the second detecting signal, a first source/drain of the transistor is coupled to the first basic input output memory, and a second source/drain of the transistor is coupled to the connector.

* * * * *